O. J. SALISBURY.
ROTARY SUCTION FILTER.
APPLICATION FILED MAY 24, 1917.
1,259,139.
Patented Mar. 12, 1918.
3 SHEETS—SHEET 1.
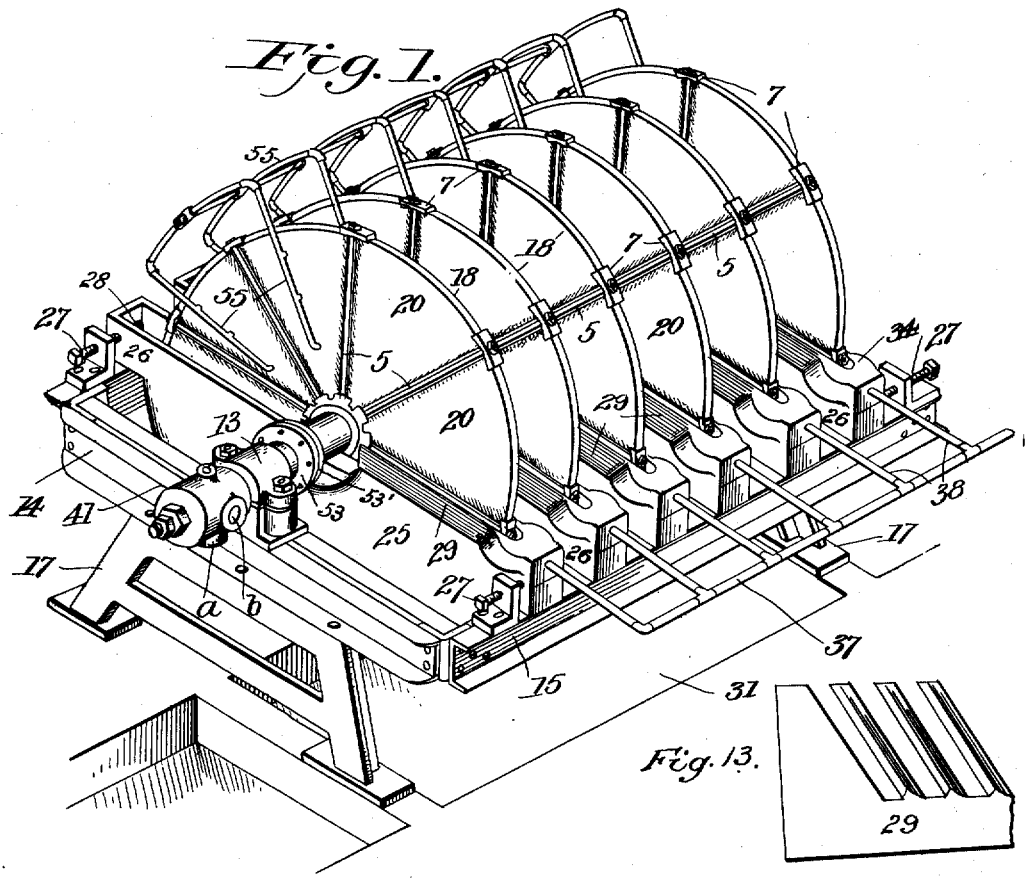
Fig. 1.
Fig. 13.
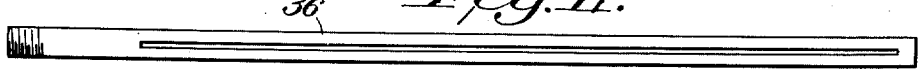
Fig. 11.
Fig. 10.
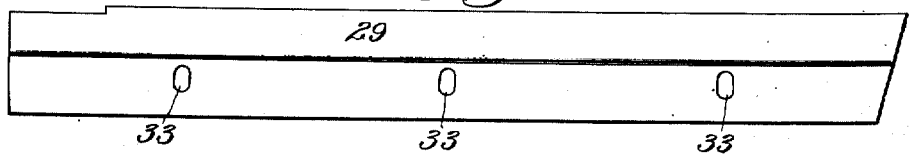
Fig. 12.
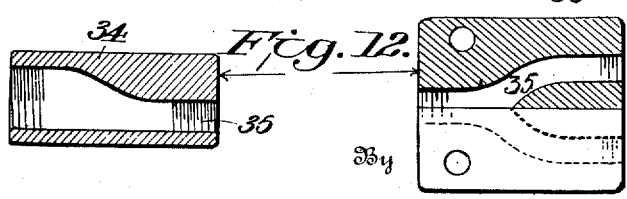
Inventor
Orange J. Salisbury
By T. Walter Fowler
Attorney O. J. SALISBURY.
ROTARY SUCTION FILTER.
APPLICATION FILED MAY 24, 1917.
1,259,139.
Patented Mar. 12, 1918.
3 SHEETS—SHEET 2.
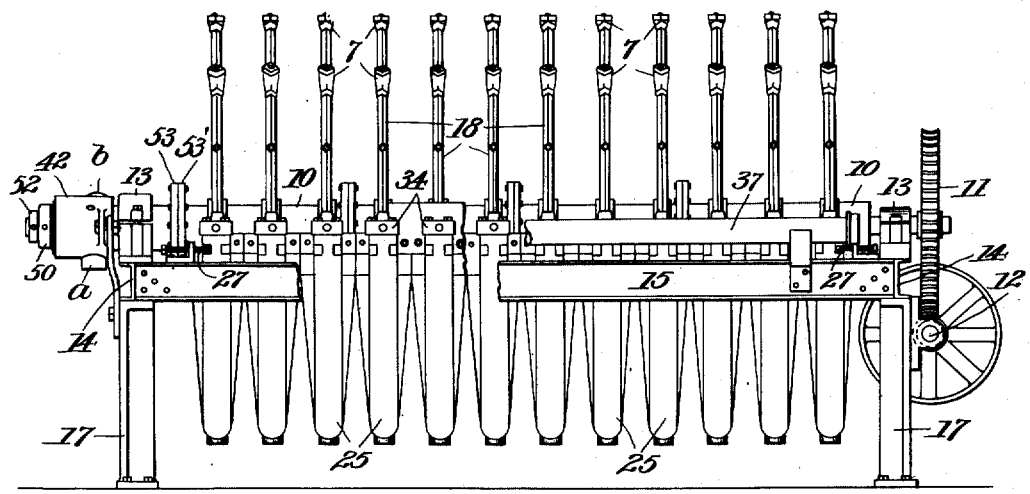
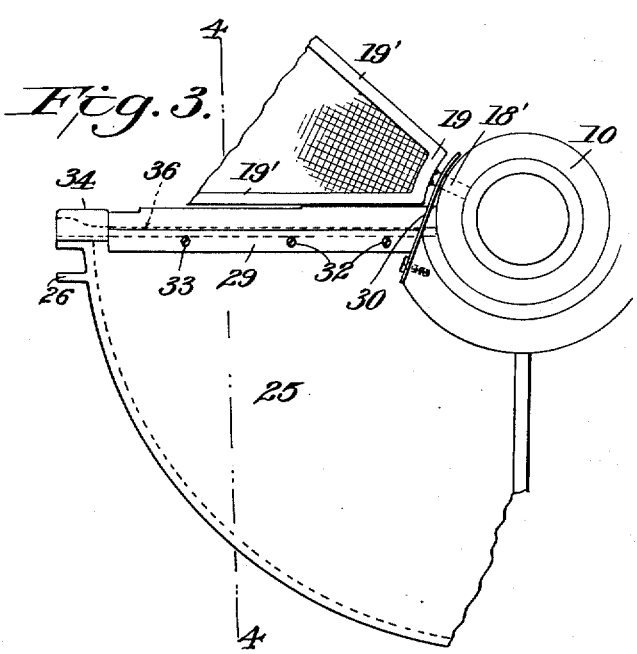
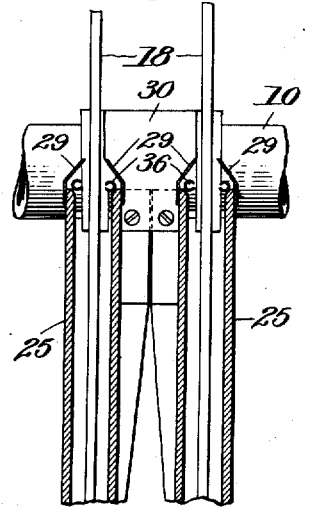
Inventor
Orange J. Salisbury
By T. Walter Fowler,
Attorney

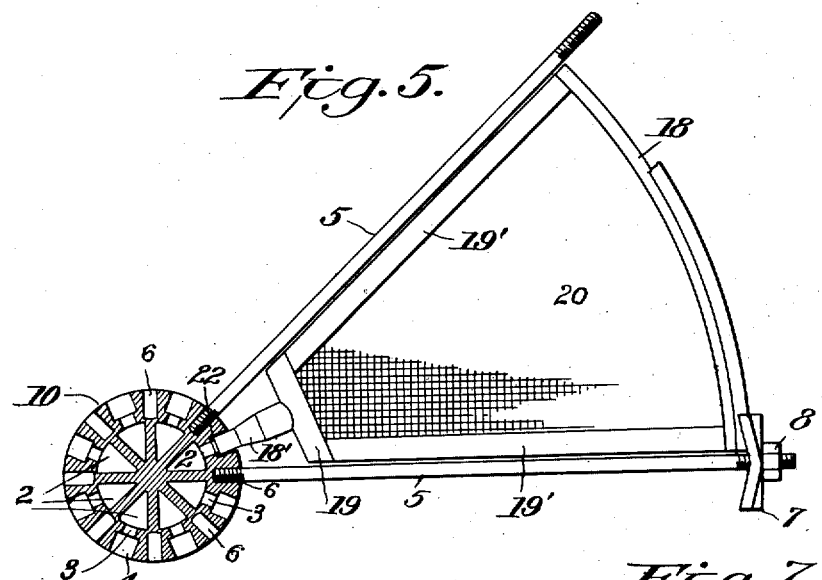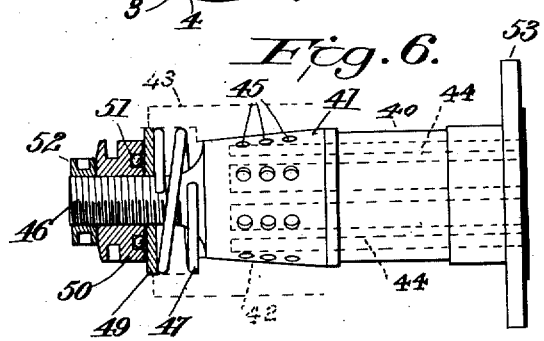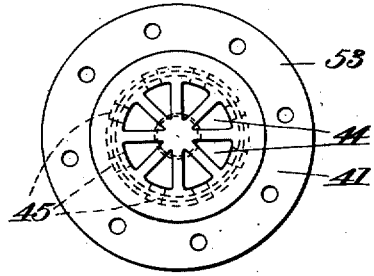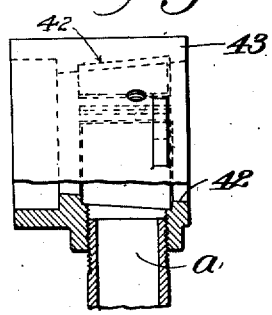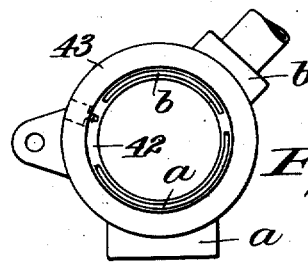

UNITED STATES PATENT OFFICE.

ORANGE JAMES SALISBURY, OF SALT LAKE CITY, UTAH.

ROTARY SUCTION-FILTER.

1,259,139.  Specification of Letters Patent.  Patented Mar. 12, 1918.

Application filed May 24, 1917. Serial No. 170,771.

*To all whom it may concern:*

Be it known that I, ORANGE J. SALISBURY, a citizen of the United States, residing at Salt Lake City, in the county of Salt Lake and State of Utah, have invented certain new and useful Improvements in Rotary Suction-Filters, of which the following is a specification.

My invention relates to a filtering apparatus; that is an apparatus which may be used to separate slimes from which precious metals have been dissolved and the liquid which holds the precious metals in solution. Specifically, the present invention has relation to a rotary suction filter of the open-leaf type, and while the invention has been found particularly useful for metallurgical work, it is not limited to this use, since it may be successfully employed in other fields, and substantially wherever the separation of liquids from solid matter is desired. It will be understood, therefore, that the apparatus which I am about to describe, is capable of almost universal use in the art of filtration, and hence I may employ it not only for filtering mineral-bearing slimes, but also for saccharine solutions, chemicals, and wherever it is purposed to separate a liquid from a solid and to discharge the solid matter, which accumulates upon the outside of the filtering medium during the filtering process.

With the above and other objects in view, my invention consists of the parts and the constructions, arrangements and combinations of parts which I will hereinafter describe and claim.

In a prior application filed March 3, 1917, Serial Number 152,440, I have disclosed an apparatus of a rotary suction open-leaf type, of this same general character; in fact in the present instance I have shown and will describe some of the leading features of the prior application; at the same time I will distinctly point out the several features of the present improvement.

In the accompanying drawings forming part of this specification and in which similar letters of reference indicate like parts in the several views;

Figure 1 is a perspective view of a rotary suction filter embodying my invention.

Fig. 2 is a side elevation of the filter with parts broken away.

Fig. 3 is an enlarged side view of a portion of a filter leaf with its scraper, baffle and individual solution tank.

Fig. 4 is a vertical sectional view on the line 4—4 of Fig. 3.

Fig. 5 is a detail showing partly in section and partly in elevation, one of the frame sections of the filter leaf and the means for attaching it to the rotary shaft.

Fig. 6 is a detail of the valve, 40.

Fig. 7 is an end view of the same.

Fig. 8 is a part elevation and part sectional view of the valve-casing.

Fig. 9 is an end view of the valve-casing.

Fig. 10 is a detail of one of the scrapers.

Fig. 11 is a detail of one of the slotted pipes, 36.

Fig. 12 represents details of one of the heads for feeding unfiltered material to a filter tank.

Fig. 13 is a modified form of the scraper shown in Fig. 10.

In my aforesaid prior application, I have disclosed a central rotary shaft having secured thereon a series of filter leaves of disk-like form, said leaves having their lower portions adapted to rotate in a tank containing the solution to be filtered. All of the filter leaves rotated in a common tank and provision was made for the discharge of the filtrate drawn into the interior of the filter leaves by the suction induced through the shaft, the filtrate passing into the shaft and through certain passages formed thereon and being finally discharged at a point outside the tank. The solids accumulating on the outside of the filter leaves were adapted to be removed by suitable scraping agencies, thereby substantially renewing the filter surfaces, and means were provided for the delivery of the solids outside of the tank.

In the present instance, one of the leading features of the invention is in the provision of a series of narrow tanks placed side by side on a shaft and each adapted to be supplied with the solution to be filtered; each of the filtering leaves being designed to rotate in one of these tanks. In other words, each tank partially incloses its individual filter-leaf and means are provided for the removal of the solids from the outer surfaces of the filter leaf during the rotation of said leaf in its tank.

As the tanks and filter leaves are alike I will for the sake of simplicity, simply describe one of the tanks and its associated filter-leaf and consider the same as a unit of the whole apparatus.

The central shaft, 10, is driven by some appropriate mechanism such as the worm-drive, 11—12, shown in Fig. 2 and upon this shaft the filter leaves are appropriately secured side by side in spaced relation, said shaft having passages, 2, through it and connecting by radial-ports, 3, with the interior of the several filter leaves, said passages also connecting with lateral outlets, a—b, in a portion of the shaft outside of the machine and through which latter ports, filtrate in one instance and wash water in another instance may be discharged. The construction and operation of the filter leaves as also the delivery of the filtrate and wash water from the shaft are substantially similar to what is fully disclosed in my aforesaid prior application.

The shaft is supported at its ends in suitable bearings, 13, supported upon channel irons or other beams, 14, which are tied together by channel irons or beams, 15, extending longitudinally along the sides of the machine, said frame construction being in turn supported upon suitable uprights or standards, 17, at the ends of the machine.

Each filter leaf is of a sectional character and as many sections may be employed to form the complete leaf as may be desired. In the present instance I have shown the leaf as composed of eight sections of substantially segmental form, each section comprising an outer segmental rim, 18, preferably curved in cross-section, an inner-flattened pipe, 19, and outwardly diverging flattened pipes, 19', which extend along and form the side edges of the section. The sides of each filter section are composed of some suitable filtering fabric, 20, beneath which is placed a backing or reinforcing plate of woven-wire or other foraminous material, for holding the fabric sides apart and forming an interior chamber into which the filtrate is drawn. This filtrate is finally delivered to the central longitudinal shaft and in order that this may be done in a simple manner, the flattened tube, 19, which forms the inner end of the filter-leaf section, is provided with a nipple, 18', adapted to fit within a slightly larger recess in the outer circumference of the central shaft, this recess having a port, 3, leading from it and connecting with one of the longitudinally extending passages, 2, formed in said shaft, as shown in Fig. 5. Upon a shoulder formed at the bottom of the aforesaid recess, an annular gasket, 22, of rubber or otherwise is seated, and the discharge end of the nipple, 18' which leads from the interior of the filter section is adapted to seat tightly upon this gasket so as to preserve a tight joint at this point.

In the present instance each of the filter leaves is secured on its periphery by means of an appropriate clamping mechanism, which comprises suitable rods, 5, extending substantially in the plane of the meeting edges of contiguous filtering sections, both ends of said rods being threaded, the inner ends being screwed into threaded holes, 6, formed in the circumference of the rotary shaft and the outer ends adapted to project beyond the circumference of the filter leaves and to receive the clamping plates, 7, which have sufficient length to bridge the joint between the edges of adjacent filter sections and to extend for a suitable distance over the sections, and having their inner faces notched to enable them to better conform to and seat upon the curved outer rim of the section, said clamping plates being held tightly upon the circumference of the filter leaves by means of nuts, 8, on the outer threaded ends of said rods. The adjustment of these nuts also forces the nipple end of the section into close engagement with the gasket, 22, and thereby causes the expansion or spreading of this gasket to more effectually preserve a leak-tight joint about the end of the nipple.

From this construction it will be seen that in the present instance the filter leaves are secured on their periphery by means of clamps, which are held in place by rods attached to the central shaft, which makes a simple construction and one which has been found quite effective for its intended purpose. The construction also has the decided advantage of permitting a rapid change of the filter leaf sections, as all that is necessary to change a section is to unloosen the clamps and remove any section of the filter leaf which may be desired. A new leaf may be substituted and the parts quickly restored to their normal operating position, as will be well understood by those skilled in the art.

As before suggested, each filter leaf revolves in its own solution tank, 25, and each of these tanks is of substantially semi-circular form, and of relatively narrow width and of sufficient depth to inclose the lower portion of the filter leaf. These independent pulp sections or tanks are designed to be held in place by means of the frame beams, 15, and to this end each tank has an end projection, 26, resting upon said beams; the sides of the tanks flare upwardly from the bottom and the upper portions of said sides may be substantially in contact so as to aid in properly spacing the tanks and holding them in position relatively to the individual filter leaves. The tanks are forced in place and maintained there by means of adjusting screws, 27, as shown in Figs. 1 and 2, and there will be no tendency for the pulp or solution that is being filtered to flow from one tank to the other, as the level of the pulp or solution in each of the individual tanks is controlled by an outlet port, 28, which in practice will be below the horizontal plane of the bottom of the central discharge shaft.

By employing the separate pulp tanks or containers, the necessity for screw or other conveyers, for discharging the solids or filter cake from the outer surfaces of the filter leaves, as disclosed in my aforesaid prior application, is eliminated as I may now use scrapers which remove the cake or solid material and allow it to directly fall by gravity to a point outside of the machine, and through the spaces between the separate sides of the individual pulp or solution tanks. To make this more manifest, attention is here directed to Figs. 4 and 5, where the upper edges of each pulp or solution tank, 25, is provided with a bent plate, 29, the upper edge of which forms a scraping surface arranged in proximity to the vertical plane in which the outer filtering sides of the filter-leaf rotate, whereby these scrapers substantially continuously remove the accumulating solids and direct the same over their surfaces and onto an appropriate downwardly inclined baffle or plate, 30, thence into the space between the separated outer sides of an adjacent solution tank, said removed solids dropping directly through this space by gravity and being collected in any desired manner. In Fig. 1 I show a hopper, 31, underlying the scraping devices and into this hopper the aforesaid removed solids will be discharged. The hopper may represent any desired form of receiver for the collection of said solids. The position of a filter section when discharging its cake or accumulated solids, and the co-acting scraper and deflector or baffle are best shown in Fig. 3, the said scraper or bent plate being adjustably secured to the upper sides of the individual filter tanks by means of screws, 32, operating through elongated slots, 33, formed in the plates, a construction which provides for an adjustment of the scraping edges relatively to the filtering surfaces with which they co-act.

The scrapers are shown as composed of single pieces of metal held in place on the upper sides of the pulp or solution tanks, but it has been found in practice that if these scrapers are made in the form of a number of thin fingers about the thickness of heavy wire, and having their direction at about 45 degrees, to the longitudinal axis of the scraper, a better discharge of the cake from the filter leaves is obtained, as these fingers have a tendency to hold the filter cloth closely against the underlying filter frame without causing wrinkles in the cloth, and at the same time the fingers will remove the cake from the filtering surfaces. When using the fingers they are constructed so that the points are rolled slightly back to avoid their catching in the filter cloth.

In Fig. 12 I show in detail a suitable head, 34, with interior channels, 35, to each of which is connected one end of a longitudinally slotted pipe, 36, which extends along each side of the filter frame above the top of the solution tank and is adapted to deliver the material to be filtered to the individual tanks, this material being supplied from a suitable manifold, 37, having branch pipes, 38, leading to the inlet end of the aforesaid head, said slotted pipes extending along the top edges of the individual tanks just beneath the scrapers, as shown in Fig. 4. The object of supplying the pulp in the manner described is two-fold. First it allows the circulation of the pulp from the bottom of the tank or pulp container by means of a pump, not shown, that can be put in closed circuit between the bottom of the tank and a main supply pipe. Second, it has a tendency to form a cake on the portion of the leaf which is not wholly submerged. In other words, in this manner, the percentage of the cake-forming portion of the filter leaf has been increased without raising the height of the pulp level in the individual tank. Third, it prevents any loss of vacuum which may occur between the discharge of the cake and the formation of a new cake at the pulp level. However, I might here state that the loss in vacuum probably would not occur in any case, as the valve which I will hereinafter describe is so constructed as to prevent any loss of vacuum during this period in the cycle of cake formation.

In the present instance I have also provided a specific form of valve, 40, which has been found very desirable in this apparatus. This valve is illustrated in Figs. 6 to 9 inclusive. It is of a turning-plug form and has a tapering surface, 41, which is designed to engage a corresponding tapered seat, 42, formed in the valve casing, 43, alined with the shaft and fixedly held relatively thereto, said valve being provided with annular longitudinally extending passages, 44, and lateral ports, 45, connecting with filtrate and wash-water ports, a—b, respectively, in the valve casing, and said valve has a stem, 46, projecting from its smaller end through the valve-casing. This casing is recessed to receive a coiled spring, 47, against which seats a thrust-ring, 49, the bearing face of which is opposed by a capstan nut, 50, threaded on the projecting stem of the valve and having an annular recess in which anti-friction balls, 51, are mounted so that they will contact with the outer face of the thrust-ring, said capstan nut being secured in its position by a lock-nut, 52, on the outer end of the valve. The valve is threaded stem of the valve and appropriately secured to the outer end of the shaft and therefore becomes a prolongation of said shaft, and to this end the valve and adjacent end of the shaft may be provided with flanges, 53—53', by which two parts may be detachably bolted together, said valve having a portion turned down to form a journal which turns in the aforesaid bearing, 13.

By means of the spring and ball-bearing before mentioned, the valve is kept close against its seat, and provision is also made for automatically taking up any wear which may occur during the operation of the press.

As in my aforesaid prior application and as before mentioned, the central radial shaft is provided with longitudinal passages, 2, say eight in number, and each section of a filter leaf connects with one of the passages.

In the present case I also employ suitable spray pipes, 55, for discharging water or other fluid against the outer sides of those portions of the filter frames which are above the liquid level of the tank, the suction produced through the shaft, and which may be accomplished by any desired means, causing the wash-water to be drawn into the filter frames, thereby washing the filter cake to recover any retained values, the wash-water passing to the inside of the filter frame and thence into the shaft and through the appropriate passage, therein and being finally delivered through the appropriate ports, b and 45, as shown in Fig. 1. In other words, as in my prior application, the discharge of filtrate and wash-water is through the central pipe and through the discharge valve and lateral ports, substantially as more fully shown and described in the former application.

The apparatus may be readily enlarged by simply adding other sections or units, as both the pulp containers and the central shaft are sectional and the parts appropriately bolted together. This is a decided advantage because it allows for the increase in the size of a filter installation by simply adding other sections to those which have already been installed. This increase in the size of the filter press can thus be accomplished at a very slight increase in cost. The use of sectional containers has proven a decided advantage in the filtering of certain pulps which have a tendency to disintegrate during the filtering operation.

Also, by using the clamping attachment on the periphery of the filter leaves the sections of the leaves are more securely held and the peripheral clamps also have the further function of serving as agitators for the pulp which is contained in the deep, but narrow container in which the lower portion of the filter leaf revolves.

The operation of the machine will be understood by those skilled in the art and therefore it is only sufficient to say that as the filter leaves revolve slowly in the pulp or material to be filtered, a deposit of solids occurs and a cake is formed on the outer surfaces of the filter leaves, which cake is washed during one stage of the revolution of the filter leaf and is discharged at another point in said revolution by means of the scrapers. If desired, high pressure air may be admitted to the interior of the filter frames to assist in the drying and removal of the cake material and the cleansing of the filter surfaces, as in my aforesaid prior application.

Having thus described my invention what I claim as new and desire to secure by Letters Patent is:

1. A filtering apparatus formed of a series of similar units arranged side by side in spaced relation and each comprising a solution tank and a filter agent revolubly mounted therein, and a longitudinal, hollow rotatable shaft above the series of tanks and upon which the series of filter agents are mounted.

2. A filtering apparatus having a central shaft provided with a liquid conduit, and a series of filter leaves mounted on said shaft side by side in spaced relation, each of said leaves having its interior connecting with the conduit in the shaft; and a series of independent solution containers underlying the shaft and adapted one for each of said filter leaves, said containers being arranged side by side and each inclosing the lower portion of a filter leaf.

3. A filtering apparatus comprising a central shaft having a fluid passage longitudinally through it, and a series of similar filtering units, each of said units comprising a filter leaf on the shaft and an individual solution container below the shaft and in which the lower portion of said filter leaf is revoluble, and means for removing deposited solids from the portions of the filter leaves above the liquid level in the tanks.

4. A filtering apparatus comprising a central shaft having a fluid passage longitudinally through it, and a series of similar filtering units, each of said units comprising a filter leaf on the shaft and an individual solution container below the shaft and in which the lower portion of said filter leaf is revoluble, and means for removing deposited solids from the portions of the filter leaves above the liquid level in the tanks, said means comprising scrapers supported above the top of the containers in proximity to the filtering surfaces of said leaves.

5. A filtering apparatus comprising a central shaft having a fluid passage longitudinally through it, and a series of similar filtering units, each of said units comprising a filter leaf on the shaft and an individual solution container below the shaft and in which the lower portion of said filter leaf is revoluble, and means for removing deposited solids from the portions of the filter leaves above the liquid level in the tanks, said means comprising scrapers supported above the top of the containers in proximity to the filtering surfaces of said leaves, and provided with a series of relatively thin fingers.

6. A filtering apparatus, comprising a central rotary shaft having a fluid passage longitudinally through it, and a plurality of similar filtering units, each of said units comprising a filter leaf on the shaft and an individual solution container below the shaft and in which the lower portion of said filter leaf is revoluble, said filter leaves each comprising a plurality of similar sections arranged substantially in edgewise abutting relation, and clamping agents engaging the periphery of the filter leaf sections, and radially connected to the shaft, for holding the sections rigidly in place.

7. A filtering apparatus, comprising a central rotary shaft having fluid passages longitudinally through it, and a plurality of similar filtering units, each of said units comprising a filter leaf on the shaft and an individual solution container below the shaft and in which the lower portion of said filter leaf is revoluble, said filter leaves each comprising a plurality of similar sections arranged in edgewise relation, and clamping agents engaging the periphery of the filter leaf sections, and radially connected to the shaft, for holding the sections rigidly in place, said periphery clamping agents serving to agitate the contents of the container as they pass through the same.

8. A filtering apparatus, comprising a central rotary shaft having fluid passages longitudinally through it, a plurality of similar filtering units, each of said units comprising a filter leaf on the shaft and an individual solution container below the shaft and in which the lower portion of said filter leaf is revoluble, said filter leaves each comprising a plurality of similar sections of segmental form arranged in edgewise relation, clamps engaging the periphery of the filter leaf sections, and radial rods engaging the clamps and extending radially and having their inner ends connected to said shaft.

9. A filtering apparatus, comprising a central rotary shaft having fluid passages longitudinally through it, a plurality of similar filtering units, each of said units comprising a filter leaf on the shaft and an individual solution container below the shaft and in which the lower portion of said filter leaf is revoluble, said filter leaves each comprising a plurality of similar sections of segmental form arranged in edgewise relation, clamps engaging the periphery of the filter leaf sections, threaded rods engaging the clamps and extending radially and having their inner ends connected to said shaft, each of said clamps spanning the joint between the edges of adjacent filter leaf sections and detachable connections for said clamps.

10. In a filtering apparatus, the combination of a central rotary shaft, having fluid passages extending longitudinally through it, and having a series of radial ports connecting with said passages, and a series of similar filtering units, each of said units comprising a filter leaf and an individual tank therefor and in which the lower portion of the leaf is revoluble, said filter leaves being formed of segmental sections hollow on the interior and having their inner ends provided with nipples for the passage of separated liquid, each of said nipples being fitted to one of the radial ports in the shaft, and detachable connections permitting the removal of any section without disturbing the others of the same leaf.

11. In a filtering apparatus, the combination of a central shaft having fluid passages extending longitudinally through it, and a series of similar filtering units, each of said units comprising a filter leaf and an individual tank therefor and in which the lower portion of the leaf is revoluble, and means for supplying solution to be filtered to the outer sides of the filter leaves at a point above the liquid level in the tank and to a portion of the filtering sides not totally submerged.

12. In a filtering apparatus, the combination of a central rotary shaft having fluid passages extending through it, and a series of similar filtering units, each of said units comprising a filter leaf and an individual tank therefor, and in which the lower portion of the leaf is revoluble, and means for supplying solution to be filtered to the separate tanks, said means including apertured pipes extending inwardly over the outer surfaces of the filter leaves and fixedly secured and adapted to supply the unfiltered solution to the outer sides of the filter leaves at a point above the liquid level in the tank and to a portion of said sides not totally submerged.

13. In a filtering apparatus, the combination of a central rotary shaft having fluid passages extending through it, and a series of similar filtering units, each of said units comprising a filter leaf and an individual tank therefor, and in which the lower portion of the leaf is revoluble, and means for supplying solution to be filtered to the separate tanks, said means including apertured pipes extending inwardly over the outer surfaces of the filtering leaves and fixedly secured and adapted to supply unfiltered solution to the outer sides of the filter leaves at a point above the liquid level in the tank and to a portion of said sides not totally submerged, a head secured to each tank having a passage connecting with said apertured pipes, and a solution supply pipe connecting with said head.

14. A filtering apparatus, formed of a series of similar units arranged side by side in spaced relation and each comprising a solution tank and a filtering agent revolubly mounted therein, and adjustable screws for holding the tanks in series in fixed relation.

15. A filtering apparatus, formed of a series of similar units arranged side by side in spaced relation and each comprising a solution tank and a filtering leaf revolubly mounted therein, and adjustable screws for holding the tanks in series in fixed relation, and scraping elements supported above the tanks and adapted to remove deposited solids from the sides of the filter leaves, said material dropping by gravity through the spaces between contiguous tanks.

16. A filtering apparatus, formed of a series of similar units arranged side by side in spaced relation and each comprising a solution tank, and a filtering leaf revolubly mounted therein, and adjustable screws for holding the tanks in series in fixed relation, scraping elements supported above the tanks and adapted to remove deposited solids from the sides of the filter leaves, said material dropping by gravity through the spaces between contiguous tanks, and a deflector in said space for directing the discharge of said solids.

17. A filtering apparatus, comprising a sectional rotatable shaft, a series of similar units arranged side by side in spaced relation, each of said units comprising a solution tank and a filter leaf mounted on the shaft, said shaft having passages extending longitudinally through it, and radial ports, and said filter leaves having their interiors communicating with said passages through said ports, a turning-plug valve carried by a terminal section of the shaft having annular passages and radial ports, said passages connecting with those through the shaft, a valve casing having radial ports adapted to register with those in the valve, and means for holding the valve to its seat and automatically compensating for wear between the valve and seat.

In testimony whereof I affix my signature.

ORANGE JAMES SALISBURY.